(12) United States Patent
Krämer

(10) Patent No.: US 9,981,527 B2
(45) Date of Patent: May 29, 2018

(54) VEHICLE HEATER

(71) Applicant: Eberspächer Climate Control Systems GmbH & Co. KG, Esslingen (DE)

(72) Inventor: Michael Krämer, Esslingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 160 days.

(21) Appl. No.: 14/662,683

(22) Filed: Mar. 19, 2015

(65) Prior Publication Data

US 2015/0266355 A1 Sep. 24, 2015

(30) Foreign Application Priority Data

Mar. 20, 2014 (DE) ................. 10 2014 205

(51) Int. Cl.
| | |
|---|---|
| *B60H 1/00* | (2006.01) |
| *B60H 1/22* | (2006.01) |
| *F24H 1/00* | (2006.01) |
| *F24H 9/18* | (2006.01) |
| *F24H 1/12* | (2006.01) |

(52) U.S. Cl.
CPC ....... *B60H 1/00328* (2013.01); *B60H 1/2209* (2013.01); *F24H 1/009* (2013.01); *F24H 1/124* (2013.01); *F24H 9/1836* (2013.01); *B60H 2001/2278* (2013.01); *F24H 1/121* (2013.01)

(58) Field of Classification Search
CPC .. B60H 1/2203; B60H 1/2209; B60H 1/2212; B60H 1/00364; B60H 2001/2253; B60H 2001/2296; B60H 2001/2287; B60H 2001/2278; F24D 5/02; F24D 12/02; F24D 2200/043; F23C 6/02; F24H 9/1836; F24H 1/124; F24H 1/121; F24H 1/009

See application file for complete search history.

(56) References Cited

U.S. PATENT DOCUMENTS

| | | | | |
|---|---|---|---|---|
| 2,169,564 | A | * | 8/1939 | Maher ................... F02M 21/10 165/160 |
| 2,236,789 | A | | 4/1941 | McCollum et al. |
| 2,619,160 | A | * | 11/1952 | Korshak ............. B60H 1/2212 126/110 R |
| 2,780,206 | A | * | 2/1957 | La Rocque ............. F22B 31/04 122/448.3 |
| 4,639,208 | A | * | 1/1987 | Inui ......................... F23C 6/02 431/1 |

(Continued)

FOREIGN PATENT DOCUMENTS

| | | |
|---|---|---|
| CN | 102642455 A | 8/2012 |
| DE | 19 27 803 A | 9/1970 |

(Continued)

OTHER PUBLICATIONS

Japanese Examination Report dated Feb. 4, 2016 in German.

*Primary Examiner* — Tho V Duong
(74) *Attorney, Agent, or Firm* — McGlew and Tuttle, P.C.

(57) ABSTRACT

A vehicle heater includes a plurality of heating units (12, 14) as well as a heat exchanger device (32) for transmitting heat provided in the heating units (12, 14) to a heat carrier medium (M). The heat exchanger device (32) includes, associated with each heating unit (12, 14), a heat exchanger zone for transmitting heat provided in the heating unit (12, 14) to the heat carrier medium (M).

14 Claims, 2 Drawing Sheets

(56) References Cited

U.S. PATENT DOCUMENTS

| | | | | |
|---|---|---|---|---|
| 4,860,725 A | * | 8/1989 | Tallman | F24H 3/087 126/110 R |
| 5,242,294 A | * | 9/1993 | Chato | F23C 15/00 122/17.1 |
| 5,363,836 A | * | 11/1994 | Briggs | F24H 3/065 126/109 |
| 6,085,738 A | * | 7/2000 | Robinson | F23D 11/00 122/17.2 |
| 6,289,851 B1 | * | 9/2001 | Rabovitser | F22B 31/04 122/240.2 |
| 8,132,416 B2 | * | 3/2012 | Prentice, III | F23G 5/006 60/670 |
| 2004/0134481 A1 | * | 7/2004 | Robinson | F24H 3/065 126/110 D |
| 2012/0138149 A1 | * | 6/2012 | Hatada | F24H 1/10 137/1 |
| 2012/0180736 A1 | * | 7/2012 | Robinson | F24H 1/287 122/14.21 |
| 2012/0205066 A1 | | 8/2012 | Humburg | |
| 2014/0261288 A1 | * | 9/2014 | Coney | F02G 3/00 123/197.1 |

FOREIGN PATENT DOCUMENTS

| | | | | |
|---|---|---|---|---|
| DE | 10 2004 059 149 A1 | | 6/2006 | |
| GB | 759512 A | * | 10/1956 | F01K 3/245 |
| JP | H06-179318 A | | 6/1994 | |
| JP | H08-188040 A | | 7/1996 | |

* cited by examiner

VEHICLE HEATER

CROSS REFERENCE TO RELATED APPLICATIONS

This application claims the benefit of priority under 35 U.S.C. § 119 of German Patent Application DE 10 2014 205 208.4 filed Mar. 20, 2014, the entire contents of which are incorporated herein by reference.

FIELD OF THE INVENTION

The present invention pertains to a vehicle heater, which can be used, for example, to heat the interior spaces of larger vehicles, e.g., buses or trucks.

BACKGROUND OF THE INVENTION

The vehicle heaters used in large motor vehicles, e.g., buses or trucks, to heat, for example, a respective interior space or to preheat a drive assembly also have, in general, large dimensions to provide a sufficiently high heat output. This means, especially in case of the use of fuel-operated vehicle heaters, that, for example, a combustion chamber has such large dimensions that the mixture of fuel and combustion to be burned therein will have sufficient space for this combustion. The fuel delivery device used to feed the fuel and the combustion air delivery device used to feed the combustion air also must have correspondingly large dimensions. A vehicle heater dimensioned for providing a comparatively high maximum heat output may have the shortcoming that the possibility of accurately controlling or regulating the heat output is limited in the range of very low necessary heat outputs because of the comparatively small quantity of fuel to be burned in this case and that there is a risk that the combustion may be compromised, for example, there is a risk of flame blow-off. Such large-sized vehicle heaters are also oversized for smaller vehicles, which may lead to the need to provide a comparatively large number of models of vehicle heaters having different dimensions for vehicles of different sizes.

SUMMARY OF THE INVENTION

An object of the present invention is to provide a vehicle heater, which can be adapted to different intended uses in a simple manner and has an improved possibility of regulating the heat output.

This object is accomplished according to the present invention by a vehicle heater comprising:
  a plurality of heating units, and
  a heat exchanger device for transmitting heat provided in the heating units to a heat carrier medium, wherein the heat exchanger device, associated with each heating unit, comprises a heat exchanger zone for transmitting heat provided in said heating unit to the heat carrier medium.

The vehicle heater designed according to the present invention has a modular character with its plurality of heating units. Each of these individual "heating unit" modules may be selected, for example, correspondingly in respect to the maximum heat output requirement to be expected for a special intended use and attached to the heat exchanger device, associated with a heat exchanger zone. If the maximum heat demand is comparatively low, a heating unit may, for example, be eliminated altogether. A substantial advantage of this modular design is that each of the plurality of heating devices can be operated during the heating operation independently from the heating unit or from the other heating units, which leads to a markedly greater variability of the heat output even in case of a comparatively small number of heat output levels that can be made available in the individual heating units. If the vehicle heater is to be used in an environment with a comparatively high heat demand, the heating output necessary therefor may be provided by two or more heating units dimensioned as small heating units. Each of these heating units can in this case be controlled or regulated in itself very accurately concerning the heat output to be generated by these units, even if only a small amount of heat needs to be provided due to the operating conditions.

To transmit the heat provided in the different heating units to a heat carrier medium to be heated, for example, a liquid, it is proposed that the heat exchanger device comprise a heat carrier flow space with a heat carrier medium inlet and a heat carrier medium outlet, wherein the heat carrier medium flow space comprises, associated with each heat exchanger zone, a heat carrier medium flow space area.

Provisions may be made in an advantageous variant for the heat carrier medium flow space areas of at least two heat exchanger zones to be connected with one another for the heat carrier medium to flow through them serially or/and for the heat carrier medium inlet and the heat carrier medium outlet to be provided such that they are associated with the heat carrier medium flow space areas of different heat exchanger zones. It is guaranteed hereby that the heat carrier medium to be heated will interact in terms of heat change with each of the heating units.

The heat exchanger device may comprise, for example, an outer housing unit defining the heat exchanger medium flow space to the outside and an inner housing unit, which defines the heat carrier medium flow space to the inside, preferably towards waste gas flow spaces of the different heat exchanger zones, and which enclose the heat carrier medium flow space together with the outer housing unit.

Provisions may be made in one embodiment, which is especially advantageous because of the small number of parts, for the outer housing unit to comprise an outer housing part defining the heat carrier medium flow space areas of at least two and preferably all heat exchanger zones to the outside. A single component, for example, one manufactured in a casting operation from a plastic or metal, can thus be used to define a plurality of and advantageously all heat carrier medium flow space areas.

To make it possible now to guarantee the possibility of flow through the heat exchanger zones designed with such an outer housing part, it is proposed that the heat exchanger medium flow space areas of two heat exchanger zones be separated by a partition, preferably of the outer housing part, and that at least one flow opening be provided in the partition for the flow of heat carrier medium from the heat carrier medium flow space area of one heat exchanger zone to the heat carrier medium flow space area of the other heat exchanger zone.

The simple structural design may be further supported by the inner housing unit comprising an inner housing part defining the heat carrier medium flow space areas of at least two and preferably all heat exchanger zones to the inside. Consequently, a single component, which is essentially not composed of a plurality of individual components, is used for a plurality of heat exchanger zones here as well.

As an alternative or in addition, provisions may be made for at least two heat exchanger zones for the inner housing unit to comprise, associated with same, inner housing parts, which are formed separately from one another and define the heat carrier medium flow space areas of these heat exchanger zones to the inside.

It is proposed, especially for providing comparatively high heat outputs in fuel-operated vehicles, that at least one and preferably each heating unit comprise a burner unit, wherein each burner unit comprises a combustion chamber for receiving fuel and combustion air and for burning a fuel/combustion air mixture. For example, the fuel also used to propel a vehicle may be used here to provide heat by combustion in one or more burner units.

Great variability of the heat output can be guaranteed by a separate combustion air delivery device or/and a separate fuel delivery device being associated with each burner unit. The association of a respective combustion air delivery device or of a respective fuel delivery device with the different burner units makes it possible to feed these burner units with quantities of combustion air and fuel to be provided specifically for these burner units in order to make it possible hereby to set the heat output independently in every individual burner unit independently from other burner units.

A compact design can be guaranteed by at least two burner units to be arranged next to each other with essentially parallel waste gas flow direction.

The design may be further simplified by providing, associated with at least two and preferably all heat exchanger zones, a common waste gas outlet open to the waste gas flow spaces of said heat exchanger zones.

The present invention pertains, further, to a heart exchanger device, especially for a vehicle heater designed according to the present invention, for transmitting heat provided in at least one heating unit to a heat carrier medium, wherein the heat exchanger device comprises, associated with a plurality of heating units, which can be combined with the heat exchanger device, a heat exchanger zone each for transmitting heat provided in a respective heating unit to the heat carrier medium.

The present invention pertains, further, to a heating unit with a heat exchanger device designed according to the present invention, further comprising, associated with at least one heat exchanger zone of the heart exchanger device, a heating unit for providing heat to be transmitted in the heat exchanger zone to a heat carrier medium. The heating unit may, of course, be designed with all the design features explained above and to be described in detail below, employing these features individually or combined.

The present invention will be described below with reference to the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
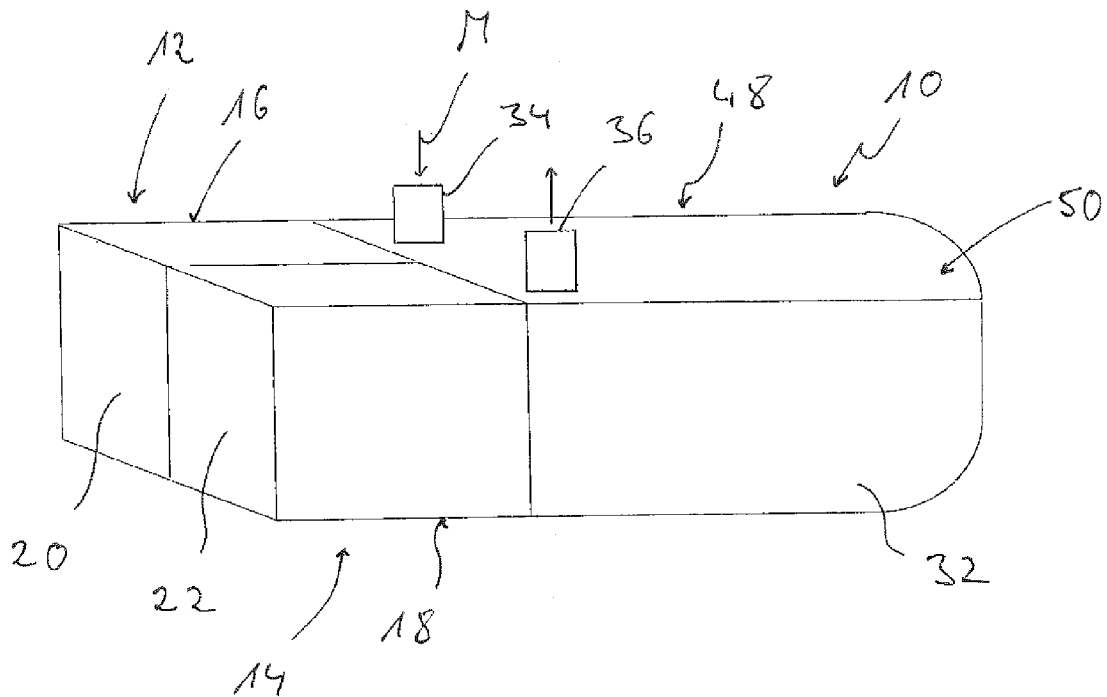
FIG. 1 is a perspective schematic view of a vehicle heater with two heating units and a heat exchanger device therefor.
Figure 3:
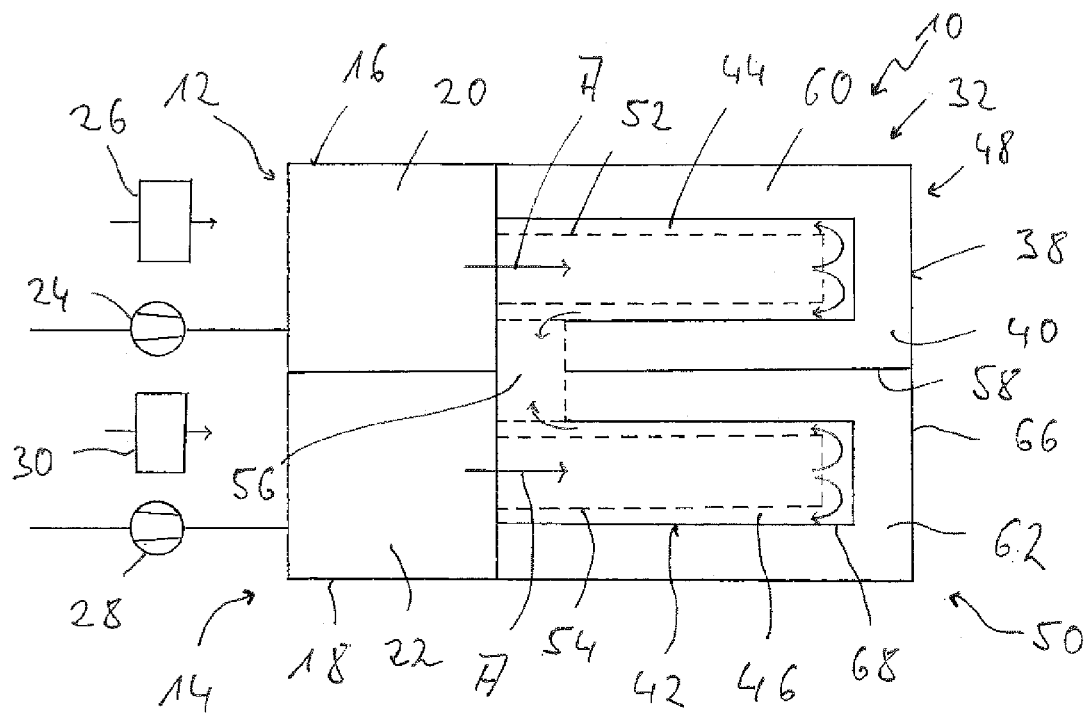
FIG. 3 is a schematic view of the heating unit according to FIG. 1, viewed in direction of view III in FIG. 2.

Referring to the drawings, a vehicle heater is generally designated by 10 in FIG. 1. The vehicle heater may be used, for example, to heat a generally liquid heat carrier medium circulating in a heat carrier medium circuit in a vehicle. The vehicle heater 10 comprises two heating units 12, 14, which may be designed, for example, as burner units 16, 18. Each of these burner units 16, 18 may have a combustion chamber 20 and 22, respectively, which is formed therein. Liquid fuel, for example, diesel fuel, is sent into the combustion chamber 20 of the burner unit 16 via a fuel delivery device 24, for example, a feed pump, which is also shown in FIG. 3. A combustion air delivery device 26, for example, a side channel blower, can be used to deliver the combustion air necessary for the combustion with the fuel into the combustion chamber 20 of the burner unit 16.

Associated with the burner unit 18, a fuel delivery device 28, for example, a feed pump, is correspondingly provided in order to send the fuel into the combustion chamber 22 of the burner unit 18. A combustion air delivery device 30, for example, a side channel blower, is used to feed the air necessary for the combustion in the combustion chamber 22 into this combustion chamber 22.

It should be noted here that one or both of the burner units 16, 18 may be designed as vaporizing burners. A porous evaporator medium provided adjacent to or in a respective combustion chamber 20, 22 can absorb the liquid fuel delivered by the fuel delivery devices 24, 28 and deliver same by the capillary action to a side located facing the respective combustion chamber 20, 22, so that the fuel can evaporate on this side and mix in the respective combustion chamber 20 and 22 with the combustion air present therein to form a flammable and combustible mixture. The combustion may be started by a respective igniting member, for example, a glow-type ignition pin.

The heating unit 10 comprises, further, a heat exchanger device 32. Via a heat carrier medium inlet 34, a heat carrier medium M, which is, for example, liquid and is fed into the heat exchanger device 32, can absorb heat, which is provided in one or both of the heating units 12, 14, in the heat carrier device 32. The heated heat carrier medium M can leave the heat exchanger device 32 at a heat carrier medium outlet 36.

Figure 2:
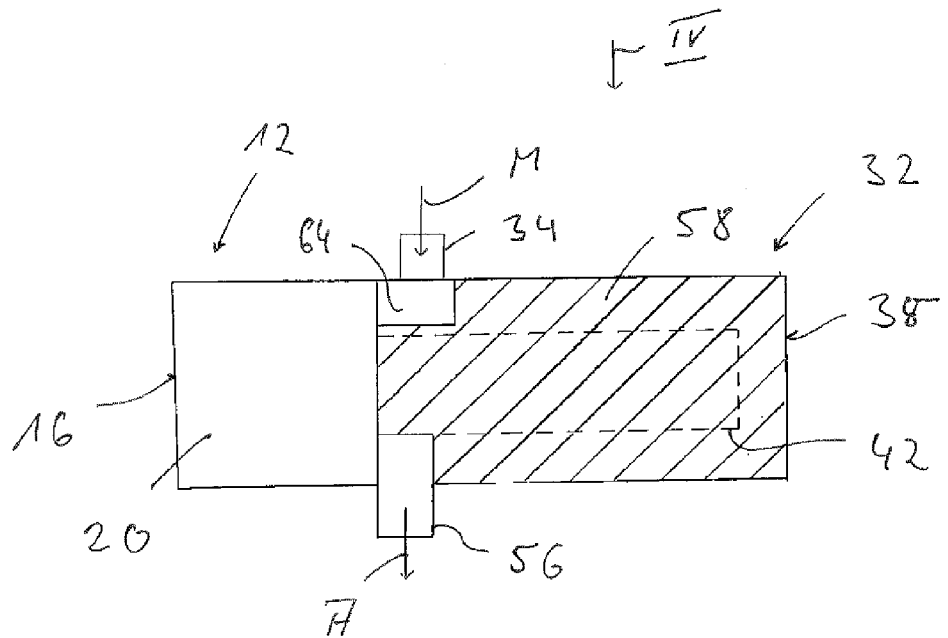
FIG. 2 is a schematic sectional view of the vehicle heater according to FIG. 1, cut away in a plane separating the two heating units.
Figure 4:
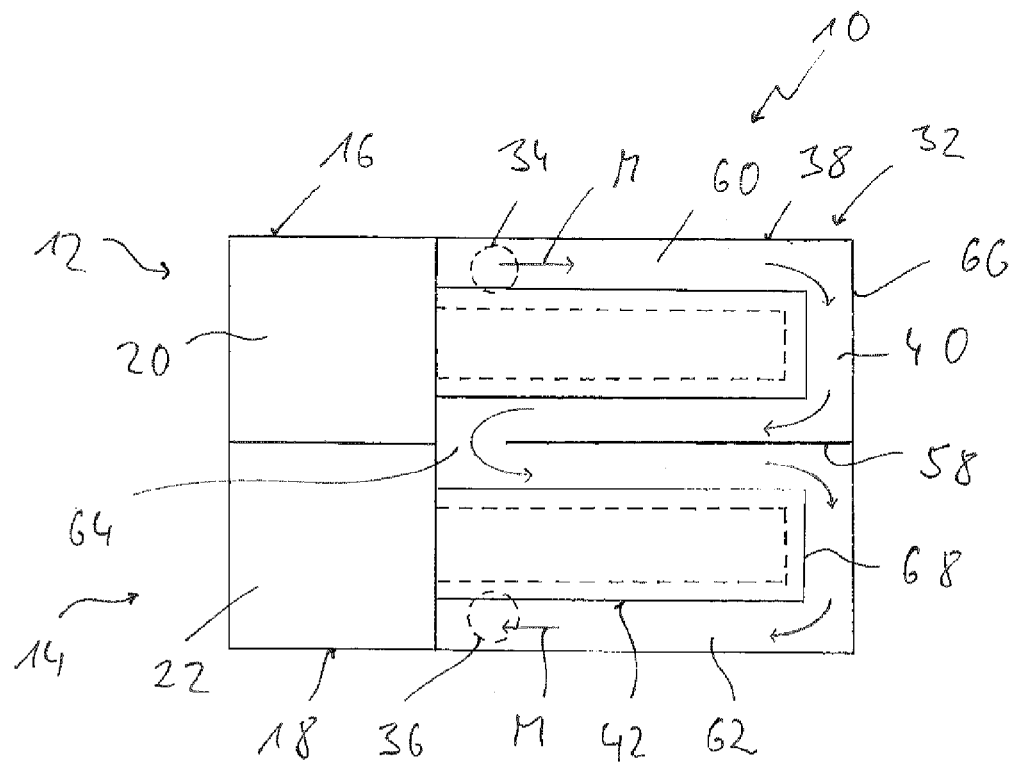
FIG. 4 is a schematic view of the heating unit according to FIG. 1, viewed in direction of view IV in FIG. 3.

FIGS. 2 through 4 show the design of the heat exchanger device 32 in schematic views. The heat exchanger device 32 comprises an outer housing unit 38, which defines a heat carrier medium flow space 40 formed in the heat exchanger device 32 to the outside, i.e., towards the surrounding area. The heat exchanger device 32 comprises, further, an inner housing unit 42, which encloses the heat carrier medium flow space 40 together with the outer housing unit 38 and defines this space to the inside towards respective waste gas flow spaces 44, 46 for the combustion waste gases generated in the burner units 20, 22.

Associated with the heating units 12, 14 or burner units 16, 18, the heat exchanger device 32 has a respective heat exchanger zone 48, 50. The heat provided in the heating unit 12 can be essentially transferred in the heat exchanger zone 48 to the heat carrier medium M flowing through the heat carrier medium flow space 40. The heat provided in the heating unit 14 can be essentially transmitted in the heat exchanger zone 50 to the heat carrier medium M flowing in the heat carrier medium flow space 40.

The combustion waste gases generated in the burner units 16, 18 leave the burner units 16, 18 via respective flame tubes 52, 54, which are associated with the respective burner units 16, and 18 and extend into the waste gas flow spaces 44, 46. The flame tubes 52, 54 are open at their end areas located at a distance from the respective associated burner unit 16, 18, so that the combustion waste gases A leaving the combustion chambers 20, 22 of the burner units 16, 18 flow first through the flame tubes 52, 54, leave same, are deflected at the inner housing unit 42 and flow back again in the direction of the burner units 16, 18. The combustion waste gases A flow along a surface of the inner housing unit 42 and transfer heat to this in the process. The heat carrier medium M flowing in the heat carrier medium flow space 40 can absorb this heat and thus leave the heat exchanger device 42 in a heated state via the heat carrier medium outlet 36.

The combustion waste gases A flowing back in the direction of the burner units 16, 18 reach a common waste gas outlet 56 and can flow farther into a waste gas guiding system. The waste gas outlet 56 is located in the lateral adjoining area of the two heat exchanger zones 48, 50, so that there is a compact design and the combustion waste gases A can leave the two waste gas flow spaces 44, 46 via the common waste gas outlet 56, which is designed, for example, as a connecting branch.

FIG. 4 shows that the heat carrier medium flow space 40 is divided in the area in which the two heat exchanger zones 48, 50 adjoin each other into a heat carrier medium flow space area 60 of the heat exchanger zone 48 and a heat carrier medium flow space area 62 of the heat exchanger zone 50 by a partition 58, which can also be recognized in FIG. 2, e.g., the outer housing unit 38. A flow opening 64, which establishes a flow connection between the two heat carrier medium flow space areas 60, 62, is formed in the partition 58. This flow opening may be provided, for example, in the area in which the heat exchanger device 32 adjoins the heating units 12, 14. The heat carrier medium inlet 34 and the heat carrier medium outlet 36 are advantageously also provided in this area, so that the most efficient flow possible is also guaranteed around the inner housing unit 42 by corresponding flow guiding elements in the heat carrier medium flow space 40. Due to the flow connection between the two heat carrier medium flow space areas 60, 62 via the flow opening 64, these two heat carrier medium flow space areas 60, 62 are connected with one another for the serial flow of the heat carrier medium M, with the heat carrier medium M first entering the upstream heat carrier medium flow space area 60 via the heat carrier medium inlet 34 provided in the areas of the heat exchanger zone 48. After flowing through this heat carrier medium flow space area 60, the heat carrier medium M enters the downstream heat carrier medium flow space area 62 via the flow opening 64 and can leave this via the heat carrier medium outlet 36 associated with the heat exchanger zone 50.

The outer housing unit 38 of the heat exchanger device 32 is advantageously designed with an outer housing part 66, i.e., essentially in one piece. The outer housing part 66 is provided and designed, associated with both heat exchanger zones 48, 50, to define the heat carrier medium flow space areas 60, 62 of said heat exchanger zones to the outside. The inner housing unit 42 may correspondingly also have an inner housing part 68, which defines, associated with both heat exchanger zones 48, 50, the heat carrier medium flow space 40 to the inside, i.e., towards the waste gas flow spaces 44, 46. The heat exchanger device 32 may consequently be designed essentially with two housing parts or main housing parts, wherein, for example, the outer housing part 66 may be made of a plastic material because of the lower thermal load, while the inner housing part 68 may be made of a metallic material because of the comparatively high thermal load generated by the combustion waste gases A. In an alternative embodiment, especially the inner housing unit 42 could have, associated with each heat exchanger zone 48 and 50, respectively, an inner housing part of its own with an essentially pot-shaped structure now, which is used in conjunction with one or more other inner housing parts to define the heat carrier medium flow space 40 to the inside. The overall structure is, in principle, essentially a pot-shaped design in each heat exchanger zone 48, 50 regardless of the number of respective outer or inner housing parts used. The outer housing unit 38 consequently provides a respective outer pot area, while the inner housing unit 42 provides a respective inner pot area inserted into the outer pot area.

The above-described design leads to a modular character of the vehicle heater, in which great variability is achieved in terms of the possibility of setting the heat output due to the incorporation of a plurality of heating units in a heat exchanger device with respective associated heat exchanger zones provided for this purpose. This is supported especially by the fact that each of the heating units can be operated independently, i.e., with an individually preset heat output, regardless of the operation of the other heating unit. A markedly larger number of maximum possible heat output levels can thus be achieved with a comparatively small number of heat output levels that can be preset in the respective heating units. It also becomes possible due to this modular character, for example, to provide two different heating devices, for example, heating devices dimensioned differently concerning the maximum heat output that can be provided. It thus becomes possible to adapt the vehicle heater to different environments of use or different maximum heat output requirements in a simple manner.

It should finally be noted that the principles of the present invention can also be used when, for example, one or both of the heating units is/are not designed as fuel-operated heating units, but as electrically operated heating units. The combination of more than two heating units with a heat exchanger device is also possible, in which case the heat exchanger device provides, associated with each of the heating units, a heat exchanger zone. The vehicle heater may also be designed, in principle, such that a heating unit is not provided associated with each heat exchanger zone provided in the heat exchanger device. If, for example, use in an environment requiring only comparatively low heat outputs is intended, it would be possible in the example being shown to use only one of the burner units, while the heat exchanger zone not being used for the heat transmission in that case could be closed by a closing element replacing the missing heating unit.

The above-described supply of the two heating units with fuel and combustion air independently from one another is especially advantageous concerning the variability of the heat output. If this is not necessary, it is also possible, for example, to supply a plurality of or all heating units with combustion air via a common combustion air delivery device or/and with fuel via a common fuel delivery device.

While specific embodiments of the invention have been shown and described in detail to illustrate the application of the principles of the invention, it will be understood that the invention may be embodied otherwise without departing from such principles.

What is claimed is:

1. A vehicle heater comprising:
   a plurality of heating units, wherein each heating unit comprises a burner unit comprising a combustion chamber for receiving fuel and combustion air and for burning a fuel/combustion air mixture, wherein a separate combustion air delivery device and a separate fuel delivery device are associated with each burner unit, each separate fuel delivery device comprising a separate fuel feed pump for feeding liquid fuel to the combustion chamber of a respective burner unit and each separate combustion air delivery device comprising a separate air blower for delivering combustion air to a respective combustion chamber; and
   a heat exchanger device transmitting heat provided in the heating units to a heat carrier medium, wherein the heat exchanger device comprises a heat exchanger zone associated with each heating unit for transmitting heat provided in this heating unit to the heat carrier medium, the heat exchanger device comprising an outer housing unit defining a heat carrier medium flow space relative to an outside, the heat exchanger device further comprising an inner housing unit, which defines the heat carrier medium flow space relative to an inside, towards waste gas flow spaces of the different heat exchanger zones and encloses the heat carrier medium flow space together with the outer housing unit, the outer housing unit comprising an outer housing part defining the heat carrier medium flow space areas of at least two of the heat exchanger zones relative to an outside, the heat carrier medium flow space areas of the at least two heat exchanger zones being separated by a partition of the outer housing part, at least one flow opening being provided in the partition for a flow of heat carrier medium from the heat carrier medium flow space area of one heat exchanger zone to the heat carrier medium flow space area of another heat exchanger zone.

2. A vehicle heater in accordance with claim 1, wherein the heat exchanger device comprises:
   a heat carrier medium inlet; and
   a heat carrier medium outlet, wherein the heat carrier medium flow space comprises a heat carrier medium flow space area associated with each heat exchanger zone.

3. A vehicle heater in accordance with claim 2, wherein at least one of:
   the heat carrier medium flow space areas of at least two heat exchanger zones are connected with one another to provide a serial flow of the heat carrier medium; and
   the heat carrier medium inlet and the heat carrier medium outlet are provided associated with the heat carrier medium flow space areas of different heat exchanger zones.

4. A vehicle heater in accordance with claim 1, wherein the inner housing unit comprises an inner housing part defining the heat carrier medium flow space areas of at least two of the heat exchanger zones relative to the inside.

5. A vehicle heater in accordance with claim 1, wherein the inner housing unit comprises inner housing parts associated with at least two heat exchanger zones, which are formed separately from one another and define the heat carrier medium flow space areas of these heat exchanger zones towards the waste gas flow spaces thereof relative to the inside.

6. A vehicle heater in accordance with claim 1, wherein one burner unit is arranged next to another burner unit with an essentially parallel waste gas flow direction, the burner unit of one of the heating units receiving a first flow of liquid fuel and a first flow of air, the burner unit of another one of the heating units receiving a second flow of liquid fuel and a second flow of air, the first flow of liquid fuel being located at a spaced location from the second flow of liquid fuel, the first flow of air being located at a spaced location from the second flow of air.

7. A vehicle heater in accordance with claim 1, further comprising a common waste gas outlet open to waste gas flow spaces of the heat exchanger zones, the common waste gas outlet being associated with at least two of the heat exchanger zones.

8. A vehicle heater in accordance with claim 1, wherein each burner unit is actuated independent of another burner unit.

9. A vehicle heater in accordance with claim 1, wherein each combustion air delivery device is operated independent of another combustion air delivery device and each fuel delivery device is operated independently of another fuel delivery device, the burner unit of one of the heating units receiving a first flow of liquid fuel and a first flow of air, the burner unit of another one of the heating units receiving a second flow of liquid fuel and a second flow of air, the first flow of liquid fuel being separate from the second flow of liquid fuel, the first flow of air being separate from the second flow of air.

10. A vehicle heater in accordance with claim 1, wherein said combustion chamber associated with one burner unit is located adjacent to said combustion chamber associated with another burner unit, said combustion chamber associated with said one burner unit being separated from said combustion chamber associated with said another burner unit via at least a housing of at least one of the one burner unit and the another burner unit.

11. A vehicle heater comprising:
   a plurality of heating units, wherein each of the heating units comprising a burner unit to provide a plurality of burner units, each of the burner units comprising a combustion chamber;
   a first combustion air delivery device comprising a first air blower;
   a first fuel delivery device comprising a first fuel feed pump for feeding liquid fuel, the combustion chamber of one of the plurality of burner units receiving fuel from the first fuel delivery device and air from the first combustion air delivery device;
   a second combustion air delivery device comprising a second air blower, the second combustion air delivery device being operated independently of the first combustion air delivery device;
   a second fuel delivery device comprising a second fuel pump for feeding liquid fuel, the second fuel delivery device being operated independently of the first fuel delivery device, the combustion chamber of another one of the plurality of burner units receiving fuel from the second fuel delivery device and air from the second combustion air delivery device; and
   a heat exchanger device transmitting heat provided in the heating units to a heat carrier medium, wherein the heat exchanger device comprises a heat exchanger zone associated with each heating unit for transmitting heat provided in a respective heating unit to the heat carrier medium, the heat exchanger device comprising an outer housing unit defining the heat carrier medium flow space relative to an outside, the heat exchanger device further comprising an inner housing unit, which defines the heat carrier medium flow space relative to an inside, towards waste gas flow spaces of the different heat exchanger zones and encloses the heat carrier medium flow space together with the outer housing unit, the outer housing unit comprising an outer housing part defining the heat carrier medium flow space areas of at least two of the heat exchanger zones relative to an outside, the heat carrier medium flow space areas of two heat exchanger zones being separated by a partition of the outer housing part, at least one flow opening being provided in the partition for a flow of heat carrier medium from the heat carrier medium flow space area of one heat exchanger zone to the heat carrier medium flow space area of another heat exchanger zone.

12. A vehicle heater in accordance with claim 11, wherein the first fuel delivery device, the first combustion air delivery device, the second combustion air delivery device and the second fuel delivery device are located at a spaced location from one another.

13. A vehicle heater comprising:
a plurality of heating units, wherein each heating unit comprises a burner unit comprising a combustion chamber for receiving fuel and combustion air and for burning a fuel/combustion air mixture, wherein a separate combustion air delivery device and a separate fuel delivery device are associated with each burner unit; and
a heat exchanger device transmitting heat provided in the heating units to a heat carrier medium, wherein the heat exchanger device comprises a heat exchanger zone associated with each heating unit for transmitting heat provided in this heating unit to the heat carrier medium, wherein the heat exchanger device comprises an outer housing unit and an inner housing unit, the outer housing unit defining the heat carrier medium flow space relative to an outside, the inner housing unit defining the heat carrier medium flow space relative to an inside, towards waste gas flow spaces of the different heat exchanger zones and the inner housing unit enclosing the heat carrier medium flow space together with the outer housing unit, the outer housing unit comprising an outer housing part defining the heat carrier medium flow space areas of at least two of the heat exchanger zones relative to an outside, the heat carrier medium flow space areas of two heat exchanger zones being separated by a partition of the outer housing part, at least one flow opening being provided in the partition for a flow of heat carrier medium from the heat carrier medium flow space area of one heat exchanger zone to the heat carrier medium flow space area of another heat exchanger zone.

14. A vehicle heater comprising:
a plurality of heating units, wherein each of the heating units comprising a burner unit to provide a plurality of burner units, each of the burner units comprising a combustion chamber;
a first combustion air delivery device;
a first fuel delivery device, the combustion chamber of one of the plurality of burner units receiving fuel from the first fuel delivery device and air from the first combustion air delivery device;
a second combustion air delivery device operated independently of the first combustion air delivery device;
a second fuel delivery device operated independently of the first fuel delivery device, the combustion chamber of another one of the plurality of burner units receiving fuel from the second fuel delivery device and air from the second combustion air delivery device; and
a heat exchanger device transmitting heat provided in the heating units to a heat carrier medium, wherein the heat exchanger device comprises a heat exchanger zone associated with each heating unit for transmitting heat provided in a respective heating unit to the heat carrier medium, the heat exchanger device comprising an inner housing unit and an outer housing unit, the outer housing unit defining the heat carrier medium flow space relative to an outside, the inner housing unit defining the heat carrier medium flow space relative to an inside, towards waste gas flow spaces of the different heat exchanger zones and the inner housing unit enclosing the heat carrier medium flow space together with the outer housing unit, the outer housing unit comprising an outer housing part defining the heat carrier medium flow space areas of at least two of the heat exchanger zones relative to an outside, the heat carrier medium flow space areas of two heat exchanger zones being separated by a partition of the outer housing part, at least one flow opening being provided in the partition for a flow of heat carrier medium from the heat carrier medium flow space area of one heat exchanger zone to the heat carrier medium flow space area of another heat exchanger zone.

* * * * *

UNITED STATES PATENT AND TRADEMARK OFFICE
CERTIFICATE OF CORRECTION

PATENT NO. : 9,981,527 B2  
APPLICATION NO. : 14/662683  
DATED : May 29, 2018  
INVENTOR(S) : Krämer Page 1 of 1

It is certified that error appears in the above-identified patent and that said Letters Patent is hereby corrected as shown below:

On the Title Page

Insert:  
--(30) Foreign Application Priority Data  
March 20, 2014 (DE) .............................10 2014 205 208.4--

Signed and Sealed this  
Fourth Day of December, 2018

Andrei Iancu  
*Director of the United States Patent and Trademark Office*